Figure 1:
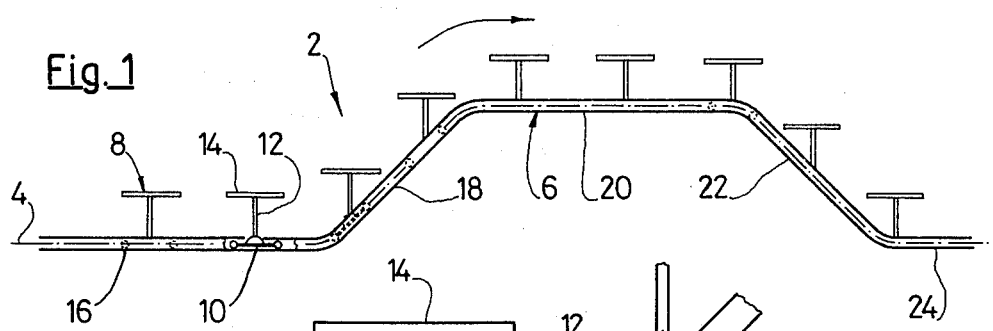
Figure 2:
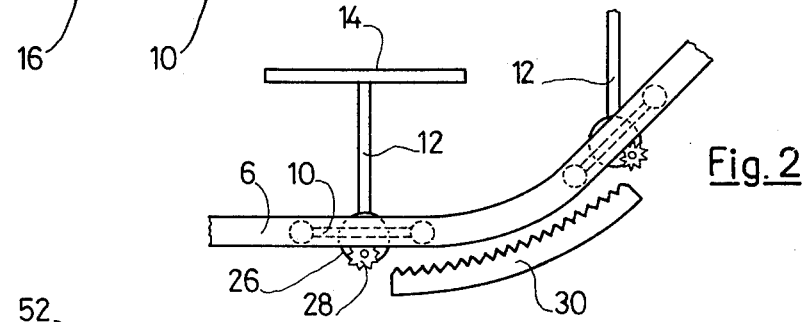

United States Patent [19]

Nielsen et al.

[11] 4,278,165
[45] Jul. 14, 1981

[54] TRAY CONVEYOR

[75] Inventors: Jacob A. Nielsen, Viby; Ole Prydtz, Silkeborg, both of Denmark

[73] Assignee: Kosan Crisplant A/S, Aarhus, Denmark

[21] Appl. No.: 41,819

[22] Filed: May 23, 1979

[30] Foreign Application Priority Data

May 23, 1978 [GB] United Kingdom ............... 21379/78

[51] Int. Cl.³ ............................................. B65G 47/46
[52] U.S. Cl. ..................................... 198/365; 198/796
[58] Field of Search ............... 198/796, 797, 798, 799, 198/800, 348, 362, 365, 370, 372, 326, 333; 104/118; 105/141

[56] References Cited

U.S. PATENT DOCUMENTS

| 1,194,932 | 8/1916 | Baker ................................ 198/796 X |
| 2,901,082 | 8/1959 | Baumann ........................ 198/370 X |

Primary Examiner—Douglas D. Watts
Attorney, Agent, or Firm—Craig and Antonelli

[57] ABSTRACT

A sorting conveyor of the tilt tray type comprising an endless train of carrier elements moved along a guiding rail system past a number of unloading stations in which the trays are selectively laterally tiltable for unloading articles therefrom. The guiding rail system extends partially along vertically sloping portions, and control means are provided for automatically holding the trays in their horizontal article carrier positions while the respective carrier elements or lower rail engaging support portions thereof are generally inclined during their passage along the sloping rail portions.

12 Claims, 7 Drawing Figures

TRAY CONVEYOR

This invention relates to a conveyor of the carrier tray type, i.e. comprising an elongated chassis and a train of carrier elements each comprising a lower support portion guided along said chassis and supporting a carrier tray operable to convey articles from a loading station past a number of unloading stations in which control means are provided for selectively causing articles to be unloaded from said carrier trays.

Normally such carrier trays are used in sorting conveyors and are movable horizontally in a closed circuit either through a carrier run and an inverted return run underneath the carrier run or through a complete or closed carrier run in the horizontal plan, i.e. so as to have a horizontal forward run and a return run which is equally usable as a continued carrier run. A preferred manner of effecting unloading of the articles on the trays is to cause the individual trays to be tilted laterally as they pass the selected respective unloading stations.

It is the purpose of the invention to provide a conveyor of the type in question which is not bound to have its effective carrier run located in a horizontal plane, and according to the invention this is achieved by arranging the carrier trays in such a manner that at least along said effective carrier run or selected portions thereof they are tiltable on or together with said carrier elements relative to said chassis about a transverse axis, such that the chassis may extend along vertically inclined run portions with the respective trays being relatively tilted to still assume a substantially horizontal position, control or guiding means being provided for maintaining the trays in their substantially horizontal positions also during their travel along said vertically inclined run portions. When the trays are adapted to effect unloading by lateral tilting the relative tiltability of the trays in the longitudinal direction should of course be provided in such a manner that the trays are still laterally tiltable for unloading purposes, though it may be chosen to make use of the same tilting mechanism for both the lateral and longitudinal tilting, if the mechanism is caused to be rotated 90° between the horizontal run portions and the inclined run portions.

In a preferred arrangement according to the invention the trays are mounted on a laterally tiltable support intermediate of a connecting frame structure comprising an upper frame supporting the tray and being pivotally hinged to the tray adjacent one end thereof, and a lower frame supporting the upper frame and being pivotally hinged thereto adjacent the other end of the tray, while the lower frame is rigidly connected with said tiltable support; hereby the tray and while still laterally tiltable by the tiltable support and is tiltable longitudinally in one direction when the tray is pivoted about its hinge to the upper frame and in the opposite direction when the upper frame is pivoted about its hinge to the lower frame, whereby it may remain horizontal during passage of both upwardly and downwardly sloping portions of the chassis.

Figure 3:
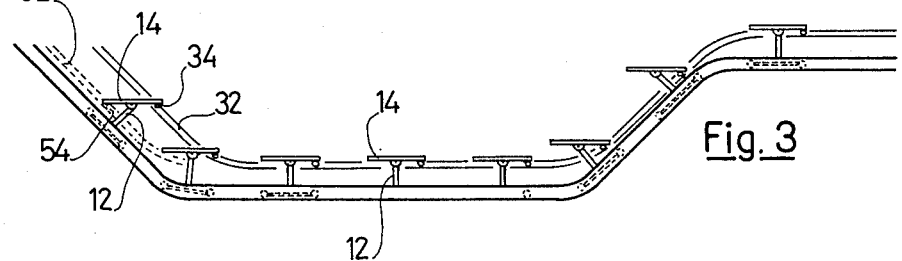
Figure 4:
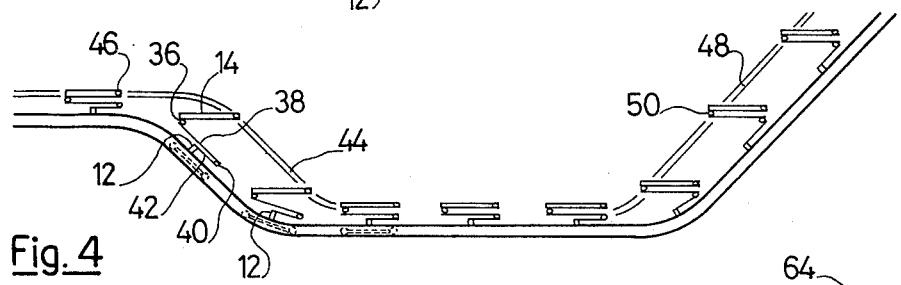
Figure 5:
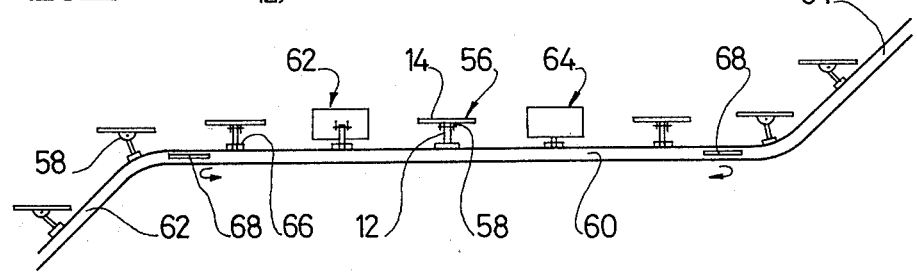
Figures 6, 7:
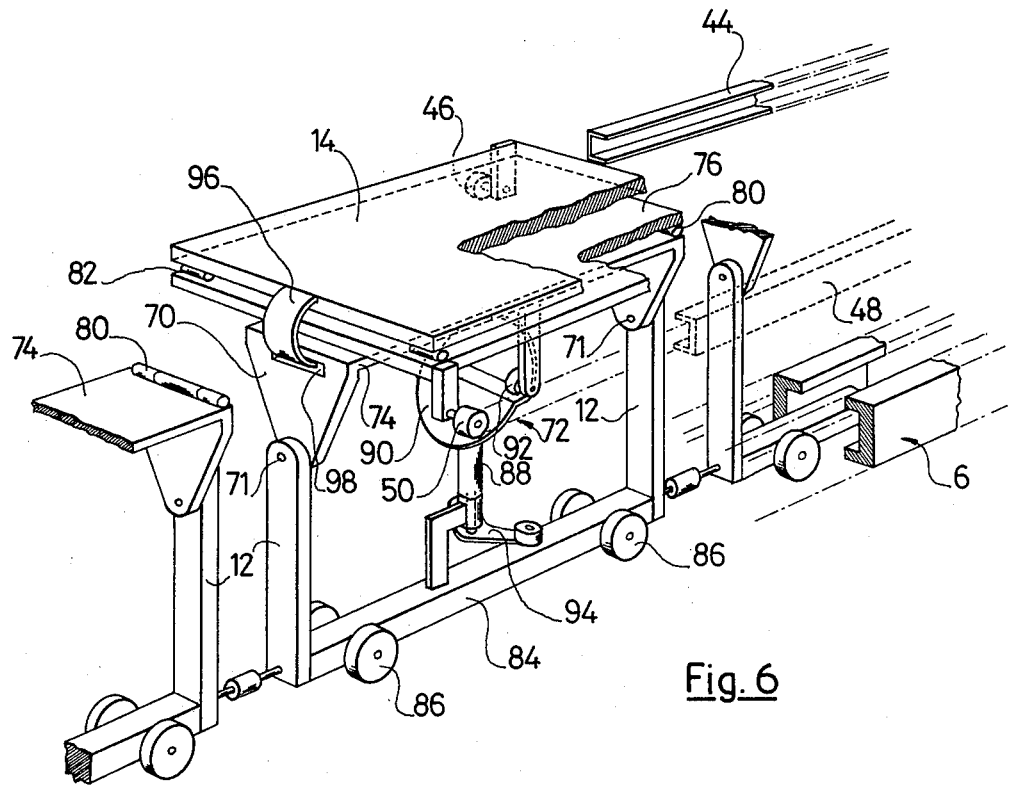

In the following, by way of examples, the invention is described in more detail with reference to the accompanying drawings, in which:

FIGS. 1–5 are schematic side views of various conveyors according to five embodiments of the invention, FIG. 6 is a perspective view of a carrier element for use in a preferred embodiment corresponding to FIG. 4, and FIG. 7 is a schematic perspective view of a modified carrier element for use in a conveyor according to the invention.

The conveyor shown in FIG. 1 is generally designated 2 and comprises an endless chain shown schematically at 4 moving along a rail system 6 and provided with interspaced carrier elements 8 each comprising a rail follower member 10, a support portion 12 and an upper horizontal article carrier plate or tray 14. The conveyor is a sorting conveyor passing a loading station in which goods or articles are placed on the various trays for various destinations as defined by various unloading stations located along the conveyor and having means for selectively causing the articles to be laterally discharged from the various trays 14, according to well known principles. The discharging in the single discharge stations may take place by a wiping off operation, by suitable diverter means, with the trays remaining in their horizontal carrier positions, or by a tray tilting operation, whereby the selected trays are tilted laterally to thereby cause the articles to slide off by gravity. A conveyor of the latter type is disclosed in our copending U.S. Pat. No. 4,139,088, this and similar conveyors being limited to carry the articles along substantially horizontal runs or run portions.

The conveyor 2 has a horizontal portion 16 and an upwardly sloping portion 18 and thereafter another horizontal portion 20 followed by a downwardly sloping portion 22 and a further horizontal portion 24. However, the support portions 12 are connected with the rail followers 10 so as to be tiltable relative thereto in the moving direction, and means are provided to control this tilting in such a manner that the supports 12 remain vertical and the trays thus horizontal as the carrier elements are moved along the sloping portions 18 and 22. The relevant tilting control may be effected in any of an almost infinite number of manners, but in FIG. 2 it is suggested that the support 12 is pivotally connected to the rail follower 10 by means of a gear 26 having a pinion 28 which, when rotated, operates to pivot the support 12. Along the curve between the two conveyor portions 16 and 18 is provided a rigid, arched rack 30 which is engaged by the pinion 28 such that by its passage along the rack 30 the pinion 28 is rotated so as to cause the support 12 to be swung relative the rail follower 10 in such a manner that the support 12 remains vertical, as shown at 12. Of course, when the carrier elements pass further from the sloping portion 18 to the new horizontal conveyor portion 20 and still further to the downwardly sloping portion 22 the pinion 28 should be rotated the other way for adjusting the position of the support 12 as required, so at such places the pinion should cooperate with corresponding rack means located above the pinion, or a corresponding pinion at the other side of the gear 26 may cooperate with a lower rack member 30 when this pinion effects inversed tilting of the support 12.

In the example shown in FIG. 3 the supports 12 are maintained in their positions perpendicular to the rail, but the trays 14 are tiltably arranged on the top end of the supports, and suitable tilting control means are provided to maintain the trays horizontal in sloping conveyor run portions. Such control means may comprise a guiding rail 32 cooperating with a sidewardly protruding roller 34 mounted adjacent one end of each tray 14.

FIG. 4 shows a preferred arrangement, where the supports 12 are again constantly perpendicular to the rail 6, while the trays 14 are pivoted, at one end at 36, to a carrier frame 38 which is in its turn pivoted, at 40 underneath the opposite end of the tray, to the outer end of a carrier arm or plate 42 rigidly secured to the top of the support 12 and projecting forwardly therefrom by approximately half the length of the tray 14. Control means are provided for tilting the tray and frame structure 14, 38 about the hinge 40 for keeping this structure horizontal along conveyor portions sloping in one direction as shown in the right hand side of FIG. 4 and for tilting the tray 14 about the hinge 36 to make the tray horizontal along conveyor portions sloping in the opposite direction, as shown in the left hand side of FIG. 4. Again, the control means for effecting the relevant relative tilting of either the trays 14 or the combined tray and frame structure 14, 38 may be selected from a plurality of more or less obvious mechanisms, but a preferred control mechanism is similar to the control system of FIG. 3, and includes a guiding rail 44 for engaging a laterally protruding roller or slide pin 46 mounted adjacent the leading end of each of the trays 14, opposed to the tray hinge 36, and another guiding rail 48, e.g. mounted at the opposite side of the main rail 6 for engaging a similar laterally protruding roller or pin 50 mounted adjacent the free end of the intermediate frame 38 of each carrier element, lengthwise opposed to the hinge 40, whereby, as clearly seen in FIG. 4, the trays 14 may remain horizontal when passing along both downwardly and upwardly sloping portions of the main rail or chassis 6. It will be appreciated that in this embodiment the supports 12 need not project above the chassis 6 at any considerable height as compared with both FIG. 1 and FIG. 3, in order to provide for sufficient free space for the trays 14 by their movement along the sloping conveyor portions. The embodiment of FIG. 4 is described in more detail below with reference to FIG. 6.

Even in the embodiment shown in FIG. 3 it may be preferred to use a second guiding rail 52, shown in dotted lines and mounted opposite to the rail 32 for cooperation with respective rollers or pins 54 mounted on the trays 14 diagonally opposite to the rollers or pins 34, whereby the trays are further stabilized in their horizontal positions. It may be chosen, however, to use the two rails 32 and 52 selectively for upwardly and downwardly sloping conveyor portions.

In FIG. 5 is illustrated an embodiment in which the carrier elements, designated 56, are specifically of the tilt tray type, the tray 14 of each of which is tiltably connected with the support 12 so as to be laterally tiltable about a longitudinal axis 58 as the carrier element passes along a horizontal run 60 of the conveyor, whereby articles on the trays may be unloaded selectively to either side when the trays are caused to be tilted correspondingly by actuator means well known in the art, as shown at 62 and 64, respectively. Once it is known to actuate means for causing the trays to tilt about the axis 58 it is realized according to the invention that similar or corresponding means may be used to cause the trays to tilt about a transverse axis in order to keep the trays horizontal as they pass along sloping conveyor portions 62 and 64, when the supports 12 project perpendicularly to the sloping direction of the conveyor chassis. In order to simplify the system it is suggested in FIG. 5 that each support 12 is rotatable about a base bearing 66 and that adjacent the end of each horizontal conveyor run 60 there is provided means such as a rack 68 for causing the supports 12 and the associated trays 14 to be rotated by 90° in such a manner that before and after the horizontal conveyor run 60, i.e. while the respective carrier elements pass along the sloping portions 62 and 64, the tilt axis 58 will be oriented crosswise of the moving direction, whereby the said tilting control means (not shown) may be used for keeping the trays 14 horizontal during their travel along the more or less sloping partial lengths of the conveyor. Of course, if lateral tray tilting is used as the only means for unloading articles from the trays, then such unloading will be restricted to take place only along the horizontal run or runs of the conveyor.

In FIG. 6 is shown a preferred embodiment which is of the type illustrated in FIG. 4. The carrier element shown is basically constructed as disclosed in our said copending application, i.e. it is specifically adapted to effect article discharge by lateral tilting of the tray 14, the tray being mounted on brackets 70 pivotally secured at 71 to the support structure 12, and a tilting control mechanism 72 being located underneath the tray. The opposed brackets 70 are interconnected by a top plate 74, and an intermediate plate or frame structure 76 is hinged at 80 to the plate 74 so as to be tiltable about a transverse axis underneath one end of the overlying tray 14. Adjacent the opposite end thereof the tray 14 is hinged to the intermediate plate or frame 76 along a transverse hinge 82. Underneath the hinge 82 the plate or frame 76 is provided with a side roller 50, as in FIG. 4, mounted in a laterally projecting position for cooperation with a guiding rail 48, and adjacent the opposite end of the tray 14 there is arranged, in a corresponding manner, a side roller 46 connected with the tray 14 and located projecting to the opposite side relative the roller 50 for cooperation with a guiding rail 44, also corresponding to FIG. 4.

The support 12 of each carrier element comprises two posts projecting upwardly from a base member 84 forming a link in the main chain 4 (FIG. 1) and provided with rollers 86 guided along the rail system 6. This guiding system as well as the tray tilt control mechanism 72 may be designed as shown in the said prior patent. Briefly, the tilt control mechanism 72 comprises a vertical shaft 88 rotatably supported by the base member 84 and having at its top end an inclined cam plate 90 engaged by two diametrically opposed rollers 92 associated with the tiltable plate member 74 such that the latter and therewith the tray 14 will be laterally tilted in response to the shaft 88 and therewith the cam plate 90 being rotated about a vertical axis. Such rotation is effected by means of a radial arm 94 of the shaft 88 being moved against an actuator abutment (not shown) which, in the selected unloading station, is caused to be shifted from an inoperative position into an operative position projecting into the movement path of the radial arm.

When a carrier element according to FIG. 6 (and FIG. 4) passes along a sloping portion of the rail 6 the roller 46 will be engaged by the rail 44 or the roller 50 by the rail 48 such that in either case the tray 14 will remain horizontal as illustrated in FIG. 4.

In order to counteract any possible instability of the system in this position the tray 14 may be provided with a locking member 96 located adjacent the axis of the hinge 82 and adapted so as to get into locking engagement with a portion, e.g. a hole 98, of the adjacent bracket 70 in response to its being tilted about the hinge 82, whereby the intermediate plate or frame 76 is locked to the bracket 70 and any tilting about the hinge 82 is prevented. Of course, the rails 44 and 48 should be omitted along the horizontal conveyor portions in order to allow the tray to be laterally tilted for unloading purposes, by operation of the tilting mechanism 72.

In FIG. 7 is schematically shown a tray 14 which is provided with hinge elements 100 at the four corners thereof, cooperating with corresponding hinge parts on a tray support structure 102. Underneath the middle of the tray 14 is arranged a ram cylinder 104 operable to force the middle point of the tray 14 upwardly. Each of the hinges 100 is operable to pivot both laterally and longitudinally, and coupling means designated 106 and shown schematically only are provided for holding the respective hinge parts together in a releasable manner, i.e. so as to be operable, by suitable actuator means (not shown) to selectively release the respective hinges 100. With this arrangement, as principally known from certain truck tilting bodies, it is possible to control the said coupling means so as to release the hinges along any side or end of the tray 14, whereby the tray will tilt to the respective opposite side or end when the ram cylinder 104 is actuated. This arrangement, therefore, will be applicable both for effecting a lateral discharge tilting of the trays and for causing the trays to remain horizontal as they move along sloping conveyor portions, when the support structure 102 is tilted correspondingly.

It should be mentioned with reference to FIG. 5 that it would even be possible to combine the rotation of the support structure 12 and the operation of the tilting control means in such a manner that along the inlet curve to the sloping portion the support is gradually rotated and the tray is gradually tilted so as to remain horizontal by these combined movements; in that case it may be sufficient to rotate the support e.g. by 45°. Even the possibility of effecting lateral unloading by tilting the trays while they move along the sloping portions may thus be maintained for example in this manner, because the tray tilting means may still be operative as the trays move along such sloping portions. That is, each tray may be mounted so as to be rotatable about an axis that is upwardly extending and oblique to the plane of the tray with a tray rotating mechanism provided for rotating the tray about this oblique axis in response to the tray passing from one to another partial chassis length such that the tray substantially horizontal. This rotation about the oblique axis may act to effect lateral tilting of the trays for unloading purposes when the tray rotating mechanism is located adjacent each unloading station.

What is claimed is:

1. A conveyor of the carrier tray type, i.e. comprising an elongated chassis and, a plurality of carrier elements interconnected by a single endless conveyor chain to form a train of carrier elements guided along said chassis, each carrier element comprising a lower support portion supporting a carrier tray operable to convey articles from a loading station past a number of unloading stations in which control means are provided for selectively causing articles to be unloaded from said carrier trays, characterized in that said chassis extend along partial lengths of mutually different linear vertical slopes and that the carrier trays are arranged so as to be tiltable about a transverse horizontal axis, tilting control means being provided adjacent said partial lengths for cooperation with said trays or the support portions thereof in such a manner that the trays are maintained, by tilting relative to the chassis in a substantially horizontal position irrespective of the varying slope of the chassis, wherein the carrier trays are arranged so as to be selectively additionally laterally tiltable for enabling unloading of articles therefrom by lateral tilting of the trays during their passage of respective selected unloading stations along the chassis.

2. A conveyor of the carrier tray type, i.e. comprising an elongated chassis and a train of carrier elements each comprising a lower support portion guided along said chassis and supporting a carrier tray operable to convey articles from a loading station past a number of unloading stations in which control means are provided for selectively causing articles to be unloaded from said carrier trays, characterized in that said chassis extend along partial lengths of mutually different vertical slopes and that the carrier trays are arranged so as to be tiltable about a transverse horizontal axis, tilting control means being provided adjacent said partial lengths for cooperation with said trays or the support portions thereof in such a manner that the trays are maintained, by tilting relative to the chassis, in a substantially horizontal position irrespective of the varying slope of the chassis, in which the support portion of each carrier element comprises a lower chassis follower member guided along the chassis so as to generally assume, in each position, an inclination corresponding to the local slope of the chassis, said carrier tray being tiltable relative said chassis follower member through a tilting adjustment system comprising adjustment control means, said tilting control means comprising stationary actuator means mounted adjacent each chassis connector portion between consecutive partial chassis lengths of different slope and operable to actuate said adjustment control means so as to effectively cause the respective carrier trays to be relatively tilted to maintain their horizontal position by their passage from one to the following partial chassis length.

3. A conveyor of the carrier tray type, i.e. comprising an elongated chassis and a train of carrier elements each comprising a lower support portion guided along said chassis and supporting a carrier tray operable to convey articles from a loading station past a number of unloading stations in which control means are provided for selectively causing articles to be unloaded from said carrier trays, characterized in that said chassis extend along partial lengths of mutually different vertical slopes and that the carrier trays are arranged so as to be tiltable about a transverse horizontal axis, tilting control means being provided adjacent said partial lengths for cooperation with said trays or the support portions thereof in such a manner that the trays are maintained, by tilting relative to the chassis, in a substantially horizontal position irrespective of the varying slope of the chassis, and wherein the trays are freely tiltable about or relative the chassis engaging portion of their respective support portions and are connected with laterally projecting rail follower means, said tilting control means comprising support rail means extending along said chassis so as to be engaged by said rail follower means of the respective trays in such a manner that the trays are hereby supported in a horizontal position during their movement along the various partial lengths of the chassis.

4. A conveyor according to claim 3, in which the support portion of each carrier tray is arranged to generally follow the direction of the various partial lengths of the chassis, the tray being tiltably secured at one end to an intermediate tilt frame member, which is located between the tray and the support portion and is tiltably connected with the support portion adjacent or underneath the opposite end of the tray, said rail follower means being arranged adjacent the opposed free ends of the tray and the intermediate tilt frame, respectively, for selective cooperation with support rail means arranged along respective upwardly and downwardly sloping partial lengths of the chassis.

5. A conveyor according to claim 4, in which the carrier tray and the support portion are provided with cooperating lock portions operable to lock together in a pivotal manner the hinged end of the carrier tray and the underlying part of the support portion in response to the tray being tilted upwardly from said intermediate tilt frame member.

6. A conveyor according to claim 2 or 3, in which the carrier trays are arranged so as to be selectively additionally laterally tiltable for enabling unloading of articles therefrom by lateral tilting of the trays during their passage of respective selected unloading stations along the chassis.

7. A conveyor according to claim 2 or 3, in which the trays are tiltable on said support portions in the longitudinal direction of the chassis, while the support portions together with the carrier trays are tiltable in the transverse direction thereof.

8. A conveyor of the carrier tray type, i.e. comprising an elongated chassis and a train of carrier elements each comprising a lower support portion guided along said chassis and supporting a carrier tray operable to convey articles from a loading station past a number of unloading stations in which control means are provided for selectively causing articles to be unloaded from said carrier trays, characterized in that said chassis extend along partial lengths of mutually different vertical slopes and that the carrier trays are arranged so as to be tiltable about a transverse horizontal axis, tilting control means being provided adjacent said partial lengths for cooperation with said trays or the support portions thereof in such a manner that the trays are maintained, by tilting relative to the chassis, in a substantially horizontal position irrespective of the varying slope of the chassis, and wherein carrier trays are each hinged to their respective support portions by means of releasable corner hinges and are connected with ram means operable to exert a lifting force on a central portion of the tray, control means being provided for selectively releasing or coupling together respective pairs of said corner hinges in such a manner that by actuation of said ram means the tray will tilt either laterally for unloading purposes or longitudinally for maintaining a horizontal position during its passage along a sloping partial length of the chassis.

9. A carrier tray conveyor comprising an elongated track, having a forward and a return run, a plurality of carrier elements interconnected by a single endless conveyor chain to form a train of carrier elements, each carrier element comprising a lower support portion and a carrier tray supported upon said lower support portion and operable to convey articles from a loading station past a number of unloading stations, and unloading control means for selectively causing articles to be unloaded from said carrier trays, wherein at least said forward run of said track has a plurality of partial lengths of mutually different vertical slopes, said carrier trays are arranged so as to be tiltable about a transverse horizontal axis, and control means are provided adjacent said partial lengths for cooperation with said trays or support portions thereof in such a manner as to maintain said trays in a substantially horizontal position, irrespective of the different slopes of said partial lengths of the track, by tilting said trays relative to said track.

10. A carrier tray conveyor according to claim 7, wherein said carrier trays are mounted for rotation about an axis parallel to said track for unloading articles therefrom by action of said unloading control means.

11. A conveyor according to claim 1, wherein said single endless conveyor forms a complete, closed circuit in horizontal plan.

12. A carrier tray conveyor according to claim 9, wherein said forward and return runs are horizontally displaced relative to each other, and said single endless conveyor chain moves therealong forming a complete, closed circuit in horizontal plan.

* * * * *